(12) United States Patent
Shi et al.

(10) Patent No.: US 12,329,241 B2
(45) Date of Patent: Jun. 17, 2025

(54) WATERPROOF AND MOISTURE-PERMEABLE SHOE UPPER AND PREPARATION METHOD THEREFOR

(71) Applicant: FUJIAN RUIHONG TEXTILE TECHNOLOGY CO., LTD., Fuqing (CN)

(72) Inventors: Jianliang Shi, Fuqing (CN); Minghui Lin, Fuqing (CN)

( * ) Notice: Subject to any disclaimer, the term of this patent is extended or adjusted under 35 U.S.C. 154(b) by 469 days.

(21) Appl. No.: 17/720,265

(22) Filed: Apr. 13, 2022

(65) Prior Publication Data
US 2022/0330652 A1 Oct. 20, 2022

(30) Foreign Application Priority Data
Apr. 14, 2021 (CN) .......................... 202110397308.4

(51) Int. Cl.
| | |
|---|---|
| A43B 7/12 | (2006.01) |
| A43B 23/02 | (2006.01) |
| B32B 5/02 | (2006.01) |
| B32B 7/12 | (2006.01) |
| B32B 27/36 | (2006.01) |
| B32B 37/06 | (2006.01) |

(52) U.S. Cl.
CPC ............ *A43B 7/125* (2013.01); *A43B 23/022* (2013.01); *B32B 5/02* (2013.01); *B32B 5/026* (2013.01); *B32B 7/12* (2013.01); *B32B 27/36* (2013.01); *B32B 37/06* (2013.01)

(58) Field of Classification Search
CPC ....... A43B 23/022; A43B 7/125; A43B 23/02; A43B 7/12; B32B 27/36; B32B 37/06; B32B 5/02; B32B 5/026; B32B 7/12
See application file for complete search history.

(56) References Cited

U.S. PATENT DOCUMENTS

2005/0266228 A1* 12/2005 Jain ...................... B32B 27/065
428/316.6

FOREIGN PATENT DOCUMENTS

| | | |
|---|---|---|
| CN | 202618404 U | 12/2012 |
| CN | 103437072 A | 12/2013 |
| CN | 110870602 A | 3/2020 |
| CN | 212147830 U | 12/2020 |
| WO | WO-2004030903 A2 * | 4/2004 ........... A41D 31/102 |

* cited by examiner

*Primary Examiner* — Lynda Salvatore
(74) *Attorney, Agent, or Firm* — Sandy Upkin

(57) ABSTRACT

A waterproof and moisture-permeable shoe upper includes a fabric upper layer, a waterproof and moisture-permeable membrane material middle layer, and an inner fabric lower layer. The fabric upper layer has anti-wicking treatment, and the waterproof and moisture-permeable membrane material middle layer is made of degradable thermoplastic elastomer. The upper layer, the middle layer of the waterproof and moisture-permeable membrane material, and the lower layer of the inner fabric are laminated through high temperature and hot pressing to form a wide-width layered composite material. Then the wide-width layered composite material is cut or hot pressed to form an upper, and the anti-wicking index of the shoe upper ≤1 cm/In 2 hours, the moisture permeability of the shoe upper is greater than or equal to 10,000 g/(m²·24 h), and the hydrostatic pressure of the shoe upper is greater than or equal to 10,000 mmH₂O.

9 Claims, 1 Drawing Sheet

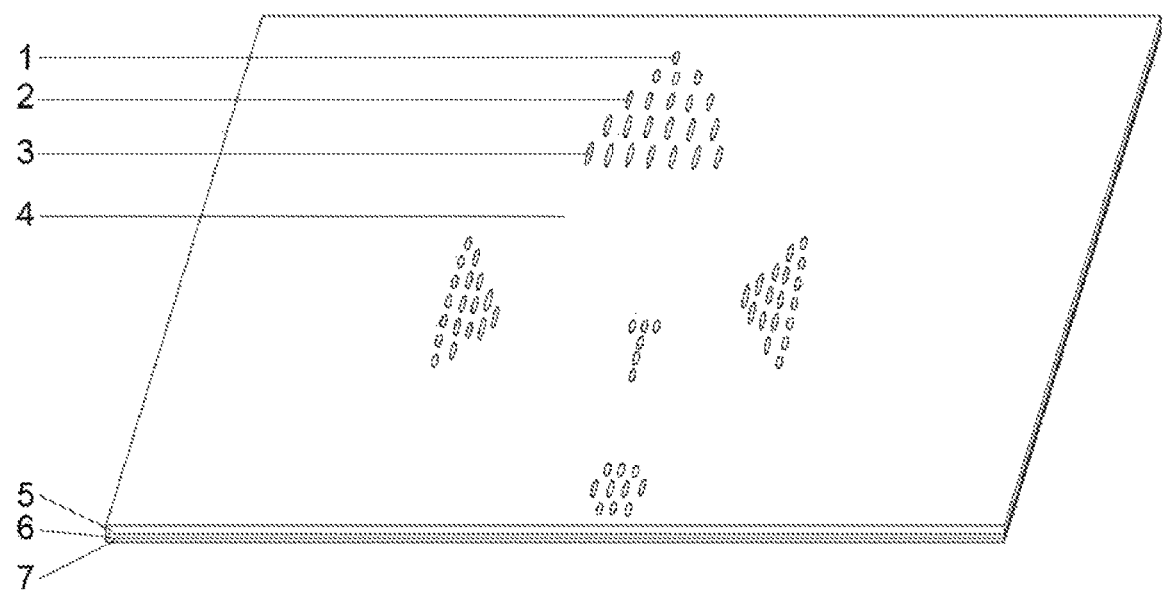

WATERPROOF AND MOISTURE-PERMEABLE SHOE UPPER AND PREPARATION METHOD THEREFOR

CROSS REFERENCE TO THE RELATED APPLICATIONS

This application is based upon and claims priority to Chinese Patent Application No. 202110397308.4, filed on Apr. 14, 2021, the entire contents of which are incorporated herein by reference.

TECHNICAL FIELD

The invention relates to the shoe upper field, in particular to a waterproof and moisture-permeable shoe upper and preparation method therefor.

BACKGROUND

The existing shoe upper is generally divided into fabric, leather and plastic materials, which generally do not have the functions of waterproof and moisture-permeability. After certain process treatment, the shoe upper material can have the functions of anti-siphon and waterproof. For example, spray or dip rolling the fabric with waterproof agent, so that the fabric surface has a certain anti splash effect. However, when the water pressure is increased or immersed in the water for a long time, the water will enter the shoes through the shoe upper, resulting in wet shoes. At present, some shoe uppers achieve good waterproof effect by superimposing conventional waterproof membrane. When the water pressure is increased, they can still prevent water from immersing into the shoes, but the moisture-permeability is poor. After wearing for a period of time, the moisture and moisture generated by the foot microenvironment lead to wet feet and uncomfortable wearing.

Chinese patent CN201811014191.1 discloses a forming method of waterproof and moisture permeable upper and its upper, which comprises a set of setting steps. An upper and a waterproof and moisture permeable film are sleeved on a shoe last, wherein at least one of the shoe upper and the waterproof and moisture permeable film comprises microwave treatable materials; and a heating and shaping step. The microwave heating sleeve is provided with the upper and the last of the waterproof and moisture permeable film, so as to bond the upper and the waterproof and moisture permeable film through the microwave treatable material, and cool and shape to form the waterproof and moisture permeable upper. In terms of technology, the vamp and waterproof and moisture permeable membrane are sheathed on the shoe last and heated. The process is relatively cumbersome, and it is difficult to control the alignment and air gap of the vamp, waterproof and moisture permeable membrane and shoe last in the processing process. In terms of effect, the waterproof and moisture permeable membrane has a certain moisture permeable effect, but it is not mentioned whether it is durable after compounding with the vamp, and whether it is waterproof and moisture permeable after repeated wearing and washing.

Chinese patent CN201310412351.9 discloses a preparation method of waterproof and moisture permeable membrane, which comprises the following steps: dissolving hydrophobic polymer in the first spinning solvent to obtain hydrophobic spinning solution; First electrospinning, the hydrophobic spinning solution to obtain a single-layer waterproof and moisture permeable film; or dissolving the hydrophilic polymer in the second spinning solvent to obtain a hydrophilic spinning solution; performing the second electrospinning on the hydrophilic spinning solution to obtain a hydrophilic nanofiber membrane; the single-layer waterproof and moisture permeable membrane is compounded with hydrophilic nanofiber membrane to obtain a double-layer waterproof and moisture permeable membrane.

Chinese patent CN201922017824.0 discloses a PU/TPU two-component waterproof and moisture permeable membrane, including TPU waterproof and moisture permeable membrane and PU waterproof and moisture permeable membrane arranged on one side of TPU waterproof and moisture permeable membrane. The double-layer setting of PU waterproof and moisture permeable membrane and TPU waterproof and moisture permeable membrane can effectively reduce the production cost of the whole waterproof and moisture permeable membrane and maintain the appearance and hand feel of PU waterproof and moisture permeable membrane. Due to the environmental protection in the process of producing TPU waterproof and moisture permeable membrane, when producing two-component waterproof and moisture permeable membrane, it can reduce the content of DMF and is conducive to the environment.

Chinese patent CN201220289118.7 discloses a new type of waterproof and moisture permeable composite fabric, which is characterized in that: from the outside to the inside; it successively comprises a fabric body, an outer waterproof and moisture permeable layer, a mesh cloth, an inner waterproof and moisture permeable layer and an inner layer of the fabric. The upper and lower surfaces of the outer waterproof and moisture permeable layer and the inner waterproof and moisture permeable layer are provided with a hot-melt adhesive layer, which is distributed in spots, and the fabric body, waterproof and moisture permeable layer, mesh cloth The waterproof and moisture permeable layer of the polytetrafluoroethylene composite fabric can make the waterproof and moisture permeable layer of the inner and outer polytetrafluoroethylene fabric comfortable, and the waterproof and moisture permeable layer of the inner and outer polytetrafluoroethylene film can be made at the same time.

SUMMARY

The object of the invention is to overcome the deficiency of the prior art and provides an anti-wicking, waterproof and moisture-permeable, washable, renewable and environmental friendly shoe upper.

The object of the invention is realized through the following technical scheme: a waterproof and moisture-permeable shoe upper, which comprises a fabric upper layer, a waterproof and moisture-permeable membrane material middle layer, and an inner fabric lower layer. The fabric upper layer has anti-wicking treatment, and the waterproof and moisture-permeable membrane material middle layer is made of degradable thermoplastic elastomer. The weight of the waterproof and moisture-permeable membrane material middle layer is 30 g/m²-300 g/m². The weight of the inner fabric is 30 g/m²-300 g/m², The upper layer, the middle layer, and the lower layer are laminated through high temperature and hot pressing to form a wide-width layered composite material. Then the wide-width layered composite material is cut or hot pressed to form an upper, and the anti-wicking index of the shoe upper ≤1 cm/In 2 hours, the moisture permeability of the shoe upper is greater than or equal to 10,000 g/(m²·24 h), the hydrostatic pressure of the shoe upper is greater than or equal to 10,000 mmH$_2$O, the upper is free from damage or penetration in water for more than 30,000 flexes.

As preferred, the degradable thermoplastic elastomer comprises a polyester thermoplastic elastomer, and the thickness of the degradable thermoplastic elastomer is 9 μm-31 μm. The width of the wide-width layered composite material is 0.9 m-2 m.

As preferred, the fabric comprises a base fabric, a warp knitted jacquard fabric and a flat woven or knitted fabric, the base fabric comprises a regular mesh fabric and a plain fabric, the warp knitted jacquard fabric is a regional engineering mesh structure, and the regional engineering mesh structure comprises a dense structure, a small mesh structure, a medium mesh structure and a large mesh structure.

As preferred, the dense structure is warp knitted closed pillar stitch, and 75 d-300 d recycled polyester fiber filaments are fully knitted under the guidance of a guard bar. The small mesh structure, the medium mesh structure and the large mesh structure are not directly connected, but are transiently connected through a dense structure.

As preferred, the transition connection section is ≥2 loop column widths or 2 loop column lengths.

As preferred, the inner fabric is a light and thin fabric with Martindale abrasion resistance ≥20000 revolutions.

As preferred, the small mesh structure, the medium mesh structure and the large mesh structure are warp knitted by the combination of two half jacquard guard bars and a conventional guard bar guiding 75 d-300 d recycled polyester fiber filament. The mesh length of the small mesh structure, the medium mesh structure and the large mesh structure differs by at least one loop column width or one loop column length.

The invention also provides a method for preparing a waterproof and moisture-permeable shoe upper, comprising: step (1), preparing the fabric upper layer, the waterproof and moisture-permeable membrane material middle layer and the inner fabric lower layer according to claim 1; step (2), performing anti-siphon treatment on the fabric upper layer; step (3), the fabric upper layer is bonded with the waterproof and moisture-permeable membrane material middle layer through high temperature and hot pressing, and then recombined with the inner fabric lower layer to form a wide-width layered composite material; and step (4), the wide-width layered composite material is cut or hot pressed to form an upper.

As preferred, during the anti-siphon treatment, the fabric is immersed in the waterproof treatment liquid and then extruded by the pressure roller, the amount of waterproof agent in the waterproof treatment liquid is 30 g/L-120 g/L, the fabric is dried after waterproof treatment, and the drying temperature is 100° C.-180° C.

As preferred, the high temperature and hot pressing includes a point bonding process, the processing temperature of the point bonding process is 100° C.-200° C., and the point bonding process applies environmental protection glue to hot press the fabric upper layer, the waterproof and moisture-permeable membrane material middle layer and the inner fabric lower layer through the pressure roller to form a wide-width layered composite material.

Compared with the prior art, the beneficial effects of the invention are:

(1) The degradable thermoplastic elastomer used in the waterproof and moisture-permeable membrane material has high wetting tension and good ductility. It fits closely with the fabric; which improves the fastness, elasticity, water washing resistance and durability of the fitting products;

(2) The prepared shoe upper has good waterproof and moisture permeability, and the anti-wicking index of the shoe upper ≤1 cm/In 2 hours, the moisture permeability of the shoe upper is greater than or equal to 10,000 g/(m$^2$·24 h), the hydrostatic pressure of the shoe upper is greater than or equal to 10,000 mmH$_2$O, the upper is free from damage or penetration in water for more than 30,000 flexes after it has been washed 10 times. The above can still maintain good waterproof, moisture permeability, and tortuous resistance. The materials used are environmentally friendly, recyclable, and degradable materials;

(3) The prepared shoe upper can be used for a long time at minus −60~−40° C. and maintain excellent performance; the micro pores of PU and PTFE are blocked due to low temperature, resulting in the reduction of air permeability. In addition, PU and TPU are easy to embrittle and crack when the temperature is ≤−20° C.

(4) The integration of fabric and membrane material simplifies the shoemaking process and eliminates the need for traditional booties. The shoe factory can use it directly to avoid the recombining process.

BRIEF DESCRIPTION OF THE DRAWINGS

FIGURE is a structural diagram of waterproof and moisture-permeable upper according to the invention, in the FIGURE: 1—a small mesh structure, 2—a medium mesh structure, 3—a large mesh structure, 4—a dense structure. 5—a fabric upper layer. 6—a waterproof and moisture-permeable membrane material middle layer, and 7—an inner fabric lower layer.

The realization of the object and beneficial effects of the invention will be further described with reference to the attached drawings in combination with the embodiment.

DETAILED DESCRIPTION OF THE EMBODIMENTS

The invention will now be further described with embodiments.

Embodiment 1

A waterproof and moisture-permeable shoe upper, which comprises a fabric upper layer, a waterproof and moisture-permeable membrane material middle layer, and an inner fabric lower layer. The fabric upper layer has anti-wicking treatment, and the waterproof and moisture-permeable membrane material middle layer is made of degradable thermoplastic elastomer. The weight of the waterproof and moisture-permeable membrane material middle layer is 30 g/m$^2$-300 g/m$^2$. The weight of the inner fabric is 30 g/m$^2$-300 g/m$^2$. The upper layer, the middle layer, and the lower layer are laminated through high temperature and hot pressing to form a wide-width layered composite material. Then the wide-width layered composite material is cut or hot pressed to form an upper, and the anti-wicking index of the shoe upper ≤1 cm/In 2 hours, the moisture permeability of the shoe upper is greater than or equal to 10,000 g/(m$^2$·24 h), the hydrostatic pressure of the shoe upper is greater than or equal to 10,000 mmH$_2$O, the upper is free from damage or penetration in water for more than 30,000 flexes.

As preferred, the degradable thermoplastic elastomer comprises a polyester thermoplastic elastomer, and the thickness of the degradable thermoplastic elastomer is 9 μm. The width of the wide-width layered composite material is 0.9 m.

As preferred; the fabric comprises a base fabric, a warp knitted jacquard fabric and a flat woven or knitted fabric, the warp knitted jacquard fabric is a regional engineering mesh structure, and the regional engineering mesh structure comprises a dense structure, a small mesh structure, a medium mesh structure and a large mesh structure.

As preferred, the dense structure is warp knitted closed pillar stitch, and 75 d recycled polyester fiber filaments are fully knitted under the guidance of a guard bar. The small mesh structure, the medium mesh structure and the large mesh structure are not directly connected, but are transiently connected through a dense structure.

As preferred, the transition connection section is ≥2 loop column widths or 2 loop column lengths.

As preferred, the inner fabric is a light and thin fabric with Martindale abrasion resistance ≥20000 revolutions.

As preferred, the small mesh structure, the medium mesh structure and the large mesh structure are warp knitted by the combination of two half jacquard guard bars and a conventional guard bar guiding 75 d-300 d recycled polyester fiber filament. The mesh length of the small mesh structure, the medium mesh structure and the large mesh structure differs by at least one loop column width or one loop column length.

The invention also provides a method for preparing a waterproof and moisture-permeable shoe upper, comprising: step (1), preparing the fabric upper layer, the waterproof and moisture-permeable membrane material middle layer and the inner fabric lower layer according to claim 1; step (2), performing anti-siphon treatment on the fabric upper layer; step (3), the fabric upper layer is bonded with the waterproof and moisture-permeable membrane material middle layer through high temperature and hot pressing, and then recombined with the inner fabric lower layer to form a wide-width layered composite material; and step (4), the wide-width layered composite material is cut or hot pressed to form an upper.

As preferred, during the anti-siphon treatment, the fabric is immersed in the waterproof treatment liquid and then extruded by the pressure roller, the amount of waterproof agent in the waterproof treatment liquid is 30 g/L, the fabric is dried after waterproof treatment, and the drying temperature is 100° C.

As preferred, the high temperature and hot pressing includes a point bonding process, the processing temperature of the point bonding process is 100° C., and the point bonding process applies environmental protection glue to hot press the fabric upper layer, the waterproof and moisture-permeable membrane material middle layer and the inner fabric lower layer through the pressure roller to form a wide-width layered composite material.

Embodiment 2

A waterproof and moisture-permeable shoe upper, which comprises a fabric upper layer, a waterproof and moisture-permeable membrane material middle layer, and an inner fabric lower layer. The fabric upper layer has anti-wicking treatment, and the waterproof and moisture-permeable membrane material middle layer is made of degradable thermoplastic elastomer. The weight of the waterproof and moisture-permeable membrane material middle layer is 30 $g/m^2$-300 $g/m^2$. The weight of the inner fabric is 30 $g/m^2$-300 $g/m^2$. The upper layer, the middle layer, and the lower layer are laminated through high temperature and hot pressing to form a wide-width layered composite material. Then the wide-width layered composite material is cut or hot pressed to form an upper, and the anti-wicking index of the shoe upper ≤1 cm/In 2 hours, the moisture permeability of the shoe upper is greater than or equal to 10,000 $g/(m^2 \cdot 24\ h)$, the hydrostatic pressure of the shoe upper is greater than or equal to 10,000 $mmH_2O$, the upper is free from damage or penetration in water for more than 30,000 flexes.

As preferred, the degradable thermoplastic elastomer comprises a polyester thermoplastic elastomer, and the thickness of the degradable thermoplastic elastomer is 15 μm. The width of the wide-width layered composite material is 1.4 m.

As preferred, the fabric comprises a warp knitted jacquard fabric, the warp knitted jacquard fabric is a regional engineering mesh structure, and the regional engineering mesh structure comprises a dense structure, a small mesh structure, a medium mesh structure and a large mesh structure.

As preferred, the dense structure is warp knitted closed pillar stitch, and 100 d recycled polyester fiber filaments are fully knitted under the guidance of a guard bar. The small mesh structure, the medium mesh structure and the large mesh structure are not directly connected, but are transiently connected through a dense structure.

As preferred, the transition connection section is ≥2 loop column widths or 2 loop column lengths.

As preferred, the inner fabric is a light and thin fabric with Martindale abrasion resistance ≥20000 revolutions.

As preferred, the small mesh structure, the medium mesh structure and the large mesh structure are warp knitted by the combination of two half jacquard guard bars and a conventional guard bar guiding 75 d-300 d recycled polyester fiber filament. The small mesh structure has two loop column lengths less than the medium mesh structure, and the medium mesh structure has two loop column lengths less than the large mesh structure.

The invention also provides a method for preparing a waterproof and moisture-permeable shoe upper, comprising: step (1), preparing the fabric upper layer, the waterproof and moisture-permeable membrane material middle layer and the inner fabric lower layer according to claim 1; step (2), performing anti-siphon treatment on the fabric upper layer; step (3), the fabric upper layer is bonded with the waterproof and moisture-permeable membrane material middle layer through high temperature and hot pressing, and then recombined with the inner fabric lower layer to form a wide-width layered composite material; and step (4), the wide-width layered composite material is cut or hot pressed to form an upper.

As preferred, during the anti-siphon treatment, the fabric is immersed in the waterproof treatment liquid and then extruded by the pressure roller, the amount of waterproof agent in the waterproof treatment liquid is 60 g/L, the fabric is dried after waterproof treatment, and the drying temperature is 140° C.

As preferred; the high temperature and hot pressing includes a point bonding process, the processing temperature of the point bonding process is 130° C., and the point bonding process applies environmental protection glue to hot press the fabric upper layer, the waterproof and moisture-permeable membrane material middle layer and the inner fabric lower layer through the pressure roller to form a wide-width layered composite material.

Embodiment 3

A waterproof and moisture-permeable shoe upper, which comprises a fabric upper layer, a waterproof and moisture-permeable membrane material middle layer, and an inner fabric lower layer. The fabric upper layer has anti-wicking treatment, and the waterproof and moisture-permeable membrane material middle layer is made of degradable thermoplastic elastomer. The weight of the waterproof and moisture-permeable membrane material middle layer is 30 $g/m^2$-300 $g/m^2$. The weight of the inner fabric is 30 $g/m^2$-300 $g/m^2$. The upper layer, the middle layer, and the lower layer are laminated through high temperature and hot pressing to form a wide-width layered composite material. Then the wide-width layered composite material is cut or hot pressed to form an upper, and the anti-wicking index of the shoe upper ≤1 cm/In 2 hours, the moisture permeability of the shoe upper is greater than or equal to 10,000 $g/(m^2 \cdot 24\ h)$, the hydrostatic pressure of the shoe upper is greater than or equal to 10,000 $mmH_2O$, the upper is free from damage or penetration in water for more than 30,000 flexes.

As preferred, the degradable thermoplastic elastomer comprises a polyester thermoplastic elastomer, and the thickness of the degradable thermoplastic elastomer is 20 The width of the wide-width layered composite material is 1.5 m.

As preferred, the fabric comprises a warp knitted jacquard fabric, and the warp knitted jacquard fabric is a regional engineering mesh structure, and the regional engineering mesh structure comprises a dense structure, a small mesh structure, a medium mesh structure and a large mesh structure.

As preferred, the dense structure is warp knitted closed pillar stitch, and 150 d recycled polyester fiber filaments are fully knitted under the guidance of a guard bar. The small mesh structure, the medium mesh structure and the large mesh structure are not directly connected, but are transiently connected through a dense structure.

As preferred, the transition connection section is ≥2 loop column widths or 2 loop column lengths.

As preferred, the inner fabric is a light and thin fabric with Martindale abrasion resistance ≥20000 revolutions.

As preferred, the small mesh structure, the medium mesh structure and the large mesh structure are warp knitted by the combination of two half jacquard guard bars and a conventional guard bar guiding 75 d-300 d recycled polyester fiber filament. The small mesh structure has two loop column lengths less than the medium mesh structure, and the medium mesh structure has three loop column lengths less than the large mesh structure.

The invention also provides a method for preparing a waterproof and moisture-permeable shoe upper, comprising: step (1), preparing the fabric upper layer, the waterproof and moisture-permeable membrane material middle layer and the inner fabric lower layer according to claim 1; step (2), performing anti-siphon treatment on the fabric upper layer; step (3), the fabric upper layer is bonded with the waterproof and moisture-permeable membrane material middle layer through high temperature and hot pressing, and then recombined with the inner fabric lower layer to form a wide-width layered composite material; and step (4), the wide-width layered composite material is cut or hot pressed to form an upper.

As preferred, during the anti-siphon treatment, the fabric is immersed in the waterproof treatment liquid and then extruded by the pressure roller, the amount of waterproof agent in the waterproof treatment liquid is 90 g/L the fabric is dried after waterproof treatment, and the drying temperature is 160° C.

As preferred, the high temperature and hot pressing includes a point bonding process, the processing temperature of the point bonding process is 160° C., and the point bonding process applies environmental protection glue to hot press the fabric upper layer, the waterproof and moisture-permeable membrane material middle layer and the inner fabric lower layer through the pressure roller to form a wide-width layered composite material.

Embodiment 4

A waterproof and moisture-permeable shoe upper, which comprises a fabric upper layer, a waterproof and moisture-permeable membrane material middle layer, and an inner fabric lower layer. The fabric upper layer has anti-wicking treatment, and the waterproof and moisture-permeable membrane material middle layer is made of degradable thermoplastic elastomer. The weight of the waterproof and moisture-permeable membrane material middle layer is 30 $g/m^2$-300 $g/m^2$, The weight of the inner fabric is 30 $g/m^2$-300 $g/m^2$. The upper layer, the middle layer, and the lower layer are laminated through high temperature and hot pressing to form a wide-width layered composite material. Then the wide-width layered composite material is cut or hot pressed to form an upper, and the anti-wicking index of the shoe upper ≤1 cm/In 2 hours, the moisture permeability of the shoe upper is greater than or equal to 10,000 $g/(m^2 \cdot 24\ h)$, the hydrostatic pressure of the shoe upper is greater than or equal to 10,000 $mmH_2O$, the upper is free from damage or penetration in water for more than 30,000 flexes.

As preferred, the degradable thermoplastic elastomer is TPE, and the thickness of the degradable thermoplastic elastomer is 31 μm. The width of the wide-width layered composite material is 2 m.

As preferred, the fabric is a warp knitted jacquard fabric, and the warp knitted jacquard fabric is a regional engineering mesh structure, and the regional engineering mesh structure comprises a dense structure, a small mesh structure, a medium mesh structure and a large mesh structure.

As preferred; the dense structure is warp knitted closed pillar stitch; and 300 d recycled polyester fiber filaments are fully knitted under the guidance of a guard bar. The small mesh structure, the medium mesh structure and the large mesh structure are not directly connected, but are transiently connected through a dense structure.

As preferred, the transition connection section is ≥2 loop column widths or 2 loop column lengths.

As preferred, the inner fabric is a light and thin fabric with Martindale abrasion resistance ≥20000 revolutions.

As preferred, the small mesh structure, the medium mesh structure and the large mesh structure are warp knitted by the combination of two half jacquard guard bars and a conventional guard bar guiding 75 d-300 d recycled polyester fiber filament. The small mesh structure has one loop column width less than the medium mesh structure, and the medium mesh structure has three loop column width less than the large mesh structure.

The invention also provides a method for preparing a waterproof and moisture-permeable shoe upper, comprising: step (1), preparing the fabric upper layer, the waterproof and moisture-permeable membrane material middle layer and the inner fabric lower layer according to claim 1; step (2), performing anti-siphon treatment on the fabric upper layer; step (3), the fabric upper layer is bonded with the waterproof and moisture-permeable membrane material middle layer through high temperature and hot pressing, and then recombined with the inner fabric lower layer to form a wide-width layered composite material; and step (4), the wide-width layered composite material is cut or hot pressed to form an upper.

As preferred, during the anti-siphon treatment, the fabric is immersed in the waterproof treatment liquid and then extruded by the pressure roller, the amount of waterproof agent in the waterproof treatment liquid is 120 g/L, the fabric is dried after waterproof treatment, and the drying temperature is 180° C.

As preferred, the high temperature and hot pressing includes a point bonding process, the processing temperature of the point bonding process is 200° C., and the point bonding process applies environmental protection glue to hot press the fabric upper layer, the waterproof and moisture-permeable membrane material middle layer and the inner fabric lower layer through the pressure roller to form a wide-width layered composite material.

Embodiment 5

A waterproof and moisture-permeable shoe upper, which comprises a fabric upper layer, a waterproof and moisture-permeable membrane material middle layer, and an inner fabric lower layer. The fabric upper layer has anti-wicking treatment, and the waterproof and moisture-permeable membrane material middle layer is made of degradable thermoplastic elastomer. The weight of the waterproof and moisture-permeable membrane material middle layer is 30 g/m$^2$-300 g/m$^2$. The weight of the inner fabric is 30 g/m$^2$-300 g/m$^2$, The upper layer, the middle layer, and the lower layer are laminated through high temperature and hot pressing to form a wide-width layered composite material. Then the wide-width layered composite material is cut or hot pressed to form an upper, and the anti-wicking index of the shoe upper ≤1 cm/In 2 hours, the moisture permeability of the shoe upper is greater than or equal to 10,000 g/(m$^2$·24 h), the hydrostatic pressure of the shoe upper is greater than or equal to 10,000 mmH$_2$O, the upper is free from damage or penetration in water for more than 30,000 flexes.

As preferred, the degradable thermoplastic elastomer is TPE, and the thickness of the degradable thermoplastic elastomer is 31 μm. The width of the wide-width layered composite material is 2 m.

As preferred, the fabric upper layer is a flat knitted fabric, and the inner fabric lower layer is a base fabric, and the base fabric is a regular mesh fabric.

As preferred, the inner fabric is a light and thin fabric with Martindale abrasion resistance ≥20000 revolutions.

The invention also provides a method for preparing a waterproof and moisture-permeable shoe upper, comprising: step (1), preparing the fabric upper layer, the waterproof and moisture-permeable membrane material middle layer and the inner fabric lower layer according to claim 1; step (2), performing anti-siphon treatment on the fabric upper layer; step (3), the fabric upper layer is bonded with the waterproof and moisture-permeable membrane material middle layer through high temperature and hot pressing, and then recombined with the inner fabric lower layer to form a wide-width layered composite material; and step (4), the wide-width layered composite material is cut or hot pressed to form an upper.

As preferred, during the anti-siphon treatment, the fabric is immersed in the waterproof treatment liquid and then extruded by the pressure roller, the amount of waterproof agent in the waterproof treatment liquid is 120 g/L, the fabric is dried after waterproof treatment, and the drying temperature is 180° C.

As preferred, the high temperature and hot pressing includes a point bonding process, the processing temperature of the point bonding process is 200° C., and the point bonding process applies environmental protection glue to hot press the fabric upper layer, the waterproof and moisture-permeable membrane material middle layer and the inner fabric lower layer through the pressure roller to form a wide-width layered composite material.

Embodiment 6

A waterproof and moisture-permeable shoe upper, which comprises a fabric upper layer, a waterproof and moisture-permeable membrane material middle layer, and an inner fabric lower layer. The fabric upper layer has anti-wicking treatment, and the waterproof and moisture-permeable membrane material middle layer is made of degradable thermoplastic elastomer. The weight of the waterproof and moisture-permeable membrane material middle layer is 30 g/m$^2$-300 g/m$^2$. The weight of the inner fabric is 30 g/m-300 g/m$^2$. The upper layer, the middle layer, and the lower layer are laminated through high temperature and hot pressing to form a wide-width layered composite material. Then the wide-width layered composite material is cut or hot pressed to form an upper, and the anti-wicking index of the shoe upper ≤1 cm/In 2 hours, the moisture permeability of the shoe upper is greater than or equal to 10,000 g/(m$^2$24 h), the hydrostatic pressure of the shoe upper is greater than or equal to 10,000 mmH$_2$O, the upper is free from damage or penetration in water for more than 30,000 flexes.

As preferred, the degradable thermoplastic elastomer is TPE, and the thickness of the degradable thermoplastic elastomer is 31 μm. The width of the wide-width layered composite material is 2 m.

As preferred, the fabric upper layer is a flat knitted fabric, and the inner fabric lower layer is a base fabric, and the base fabric is a plain fabric.

As preferred, the inner fabric is a light and thin fabric with Martindale abrasion resistance ≥20000 revolutions.

The invention also provides a method for preparing a waterproof and moisture-permeable shoe upper, comprising: step (1), preparing the fabric upper layer, the waterproof and moisture-permeable membrane material middle layer and the inner fabric lower layer according to claim 1; step (2), performing anti-siphon treatment on the fabric upper layer; step (3), the fabric upper layer is bonded with the waterproof and moisture-permeable membrane material middle layer through high temperature and hot pressing, and then recombined with the inner fabric lower layer to form a wide-width layered composite material; and step (4), the wide-width layered composite material is cut or hot pressed to form an upper.

As preferred, during the anti-siphon treatment, the fabric is immersed in the waterproof treatment liquid and then extruded by the pressure roller, the amount of waterproof agent in the waterproof treatment liquid is 120 g/L, the fabric is dried after waterproof treatment, and the drying temperature is 180° C.

As preferred, the high temperature and hot pressing includes a point bonding process, the processing temperature of the point bonding process is 200° C., and the point bonding process applies environmental protection glue to hot press the fabric upper layer, the waterproof and moisture-permeable membrane material middle layer and the inner fabric lower layer through the pressure roller to form a wide-width layered composite material.

The above is only a preferred embodiment of the invention and does not limit the invention. Any simple modification, change or equivalent transformation of the above embodiment according to the technical essence of the invention still belong to the protection scope of the technical scheme of the invention.

What is claimed is:

1. A waterproof and moisture-permeable shoe upper, comprising
a fabric upper layer,
a waterproof and moisture-permeable membrane material middle layer, and
an inner fabric lower layer; wherein
the fabric upper layer is a warp knitted jacquard fabric and has anti-wicking treatment, and the waterproof and moisture-permeable membrane material middle layer is made of degradable thermoplastic elastomer comprising a polyester thermoplastic elastomer;
a weight of the waterproof and moisture-permeable membrane material middle layer is 30 g/m²-300 g/m²; a weight of the inner fabric lower layer is 30 g/m²-300 g/m²;
the fabric upper layer, the waterproof and moisture-permeable membrane material middle layer, and the inner fabric lower layer are laminated through high temperature and hot pressing to form a layered composite material;
then the layered composite material is cut or subjected to a second hot pressing to form the waterproof and moisture-permeable shoe upper, and an anti-wicking index of the waterproof and moisture-permeable shoe upper is less than or equal to 1 cm/In 2 hours, a moisture permeability of the waterproof and moisture-permeable shoe upper is greater than or equal to 10,000 g/(m²·24 h), a hydrostatic pressure of the waterproof and moisture-permeable shoe upper is greater than or equal to 10,000 mmH$_2$O, and the waterproof and moisture-permeable shoe upper is free from damage or penetration in water for more than 30,000 flexes.

2. The waterproof and moisture-permeable shoe upper according to claim 1, wherein the thickness of the waterproof and moisture-permeable membrane material middle layer is 9 μm-31 μm; and a width of the layered composite material is 0.9 m-2 m.

3. The waterproof and moisture-permeable shoe upper according to claim 1, wherein the warp knitted jacquard fabric is a regional engineering mesh structure, and the regional engineering mesh structure comprises a dense structure, a small mesh structure, a medium mesh structure and a large mesh structure.

4. The waterproof and moisture-permeable shoe upper according to claim 3, wherein the regional engineering mesh structure is warp knitted closed pillar stitch, and 75 d-300 d recycled polyester fiber filaments are fully knitted under a guidance of a guard bar.

5. The waterproof and moisture-permeable shoe upper according to claim 1, wherein the inner fabric lower layer has a Martindale abrasion resistance greater than or equal to 20000 revolutions.

6. The waterproof and moisture-permeable shoe upper according to claim 3, wherein the small mesh structure, the medium mesh structure and the large mesh structure are warp knitted by a combination of two half jacquard guard bars and a conventional guard bar guiding 75 d-300 d recycled polyester fiber filament.

7. A method for preparing the waterproof and moisture-permeable shoe upper according to claim 1, comprising:
step (1), preparing the fabric upper layer, the waterproof and moisture-permeable membrane material middle layer and the inner fabric lower layer;
step (2), performing anti-siphon treatment on the fabric upper layer;
step (3), allowing the fabric upper layer to be bonded with the waterproof and moisture-permeable membrane material middle layer through high temperature and hot pressing, and then recombined with the inner fabric lower layer to form the layered composite material; and
step (4), cutting or hot pressing the layered composite material to form the waterproof and moisture-permeable shoe upper.

8. The method for preparing the waterproof and moisture-permeable shoe upper according to claim 7, wherein during the anti-siphon treatment, the fabric is immersed in a waterproof treatment liquid and then extruded by the pressure roller, an amount of waterproof agent in the waterproof treatment liquid is 30 g/L-120 g/L, the fabric is dried after waterproof treatment, and a drying temperature is 100° C.-180° C.

9. The method for preparing the waterproof and moisture-permeable shoe upper according to claim 7, wherein the high temperature and hot pressing comprises a point bonding process, a processing temperature of the point bonding process is 100° C.-200° C., and the point bonding process applies environmental protection glue to hot press the fabric upper layer, the waterproof and moisture-permeable membrane material middle layer and the inner fabric lower layer through a pressure roller to form the layered composite material.

* * * * *